(12) United States Patent
Wu

(10) Patent No.: US 7,033,061 B1
(45) Date of Patent: Apr. 25, 2006

(54) BACKLIGHT MODULE AND LENS THEREOF

(75) Inventor: Meng-Chai Wu, Jhubei (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/234,932

(22) Filed: Sep. 26, 2005

(30) Foreign Application Priority Data

Jan. 12, 2005  (TW) ............................. 94100833 A

(51) Int. Cl.
*F21V 7/04* (2006.01)
*F21V 5/00* (2006.01)
*G02B 13/20* (2006.01)
*G02B 5/02* (2006.01)

(52) U.S. Cl. ...................... 362/607; 362/606; 362/609; 359/707; 359/599

(58) Field of Classification Search ................ 362/607, 362/606, 609, 611, 608, 327, 328, 335; 359/726–727, 359/850, 707, 599, 866, 857
See application file for complete search history.

(56) References Cited

U.S. PATENT DOCUMENTS

| 2,254,962 | A | * | 9/1941 | Bitner et al. ................ 362/327 |
| 3,825,322 | A | * | 7/1974 | Mast ........................... 359/799 |
| 2002/0085390 | A1 | * | 7/2002 | Kiyomoto et al. .......... 362/555 |

* cited by examiner

*Primary Examiner*—Renee Luebke
*Assistant Examiner*—Evan Dzierzynski
(74) *Attorney, Agent, or Firm*—Thomas, Kayden, Horstemeyer & Risley

(57) ABSTRACT

A backlight module for a liquid crystal display includes a reflective sheet, at least one light source above the reflective sheet, and a lens above the light source. The lens has a light-permeable surface at the bottom, a light-reflecting surface formed on the top of the lens, two side surfaces connecting the light-reflecting surface and the light-permeable surface, and a diffusion surface formed at the center of the light-reflecting surface. Profiles of the light-permeable surface and the light-reflecting surface are concave. The diffusion surface is convex. The lens of the invention allows light emitted by the light source to diffuse more uniformly.

9 Claims, 3 Drawing Sheets

BACKLIGHT MODULE AND LENS THEREOF

This application claims the benefit of Taiwan application Serial No. 094100833, filed Jan. 12, 2005.

BACKGROUND

The invention relates to a backlight module, and in particular to a lens of the backlight module for a liquid crystal display.

Several lamps make up the backlight of a direct type liquid crystal display. During manufacture, the number of tubes increases to maintain luminance in larger displays.

Referring to FIG. 1, a backlight module comprises a diffuser 11, a frame 12, a reflective sheet 13, and lamps 14. The diffuser 11 and the reflective sheet 13 are fixed by the frame 12. The lamps 14, between the diffuser 11 and the reflective sheet 13, generate light emitting directly or reflected to the diffuser 11 by the reflective sheet 13 and passing through the diffuser 11. Because luminance between the lamps 14 and reflective sheet 13 of the conventional backlight module 1 differs, the brightness of a display is not uniform. Although increasing distance d between the lamps 14 and the diffuser 11 solves the problem mentioned above, thickness of the backlight module is increased, affecting display quality.

Referring to FIG. 2, providing an additional diffuser 11a also solves problems. The thickness of the sum of the diffuser 11a and the diffuser 11 increases and the haze of the diffusers 11 and 11a blurs the outline of the lamps 14. Applying diffuser 11a not only increases the cost but also the thickness of the backlight module 1. Overlapping diffusers 11 and 11a further affects output of the light source. Increasing the number of lamps 14 to maintain luminance also increases costs.

SUMMARY

Embodiments of the invention provide a backlight module comprising a reflective sheet, at least one light source, and a lens. The light source is located above the reflective sheet. The lens is located above the light source and comprises a light-reflecting surface, a light-permeable surface, two side surfaces, and a diffusion surface. The light-permeable surface is located at the bottom of the lens, with a concave cross-section thereof. The light-reflecting surface is above the lens, with a concave cross-section thereof. The side surfaces connect the light-reflecting surface and the light-permeable surface. The diffusion surface is convex, formed on the central axis of the light-reflecting surface. Light from the light source is reflected and scattered by the lens to normalize light distribution and to make backlight module output lighten uniformly.

The lens of the invention comprises a light-reflecting surface, a light-permeable surface, two side surfaces, and a diffusion surface. The light-permeable surface is located at the bottom of the lens, with a concave cross-section. The light-reflecting surface is above the lens, with a concave cross-section. The side surfaces connect the light-reflecting surface and the light-permeable surface. The diffusion surface is convex, formed on the central axis of the light-reflecting surface.

BRIEF DESCRIPTION OF THE DRAWINGS

Embodiments of the invention can be more fully understood by reading the subsequent detailed description in conjunction with the examples and references made to the accompanying drawings, wherein.

DETAILED DESCRIPTION

Figure 1:
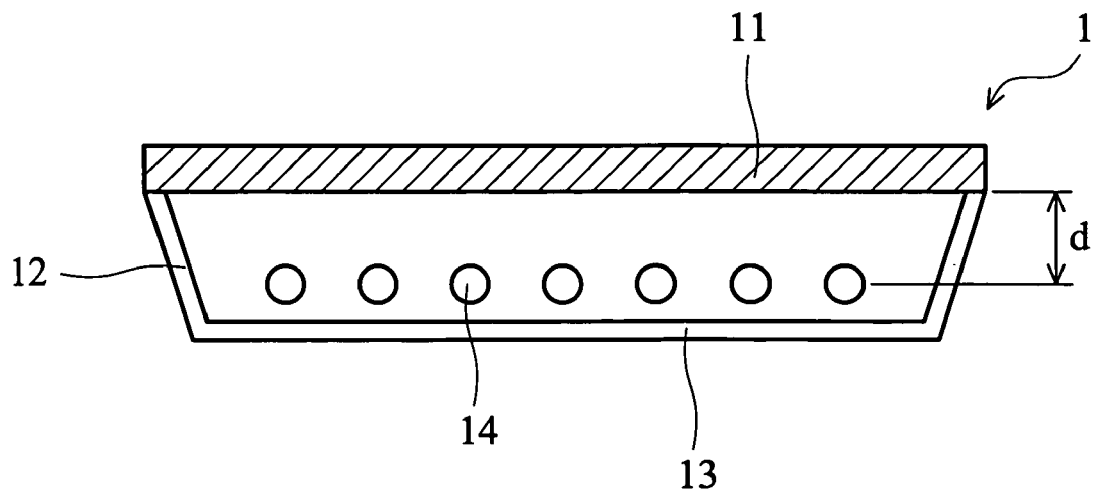
FIG. 1 is a schematic drawing of a conventional backlight module for a liquid crystal display.
Figure 2:
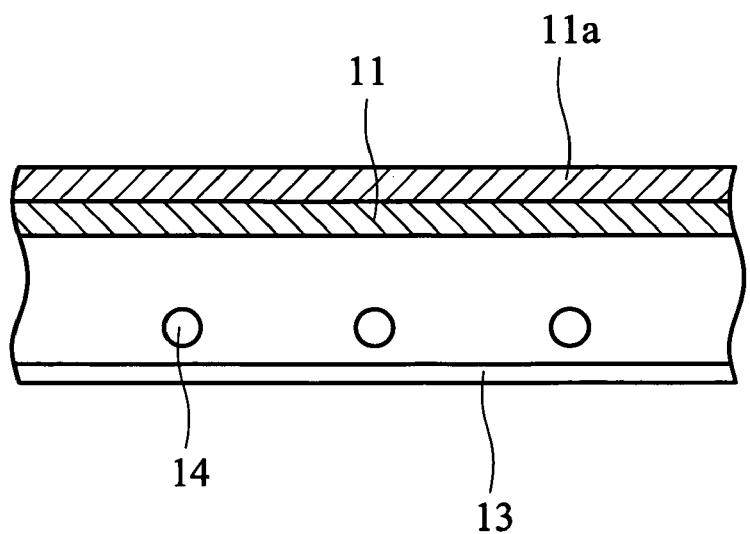
FIG. 2 is a schematic drawing of a conventional backlight module for a liquid crystal display.
Figure 3:
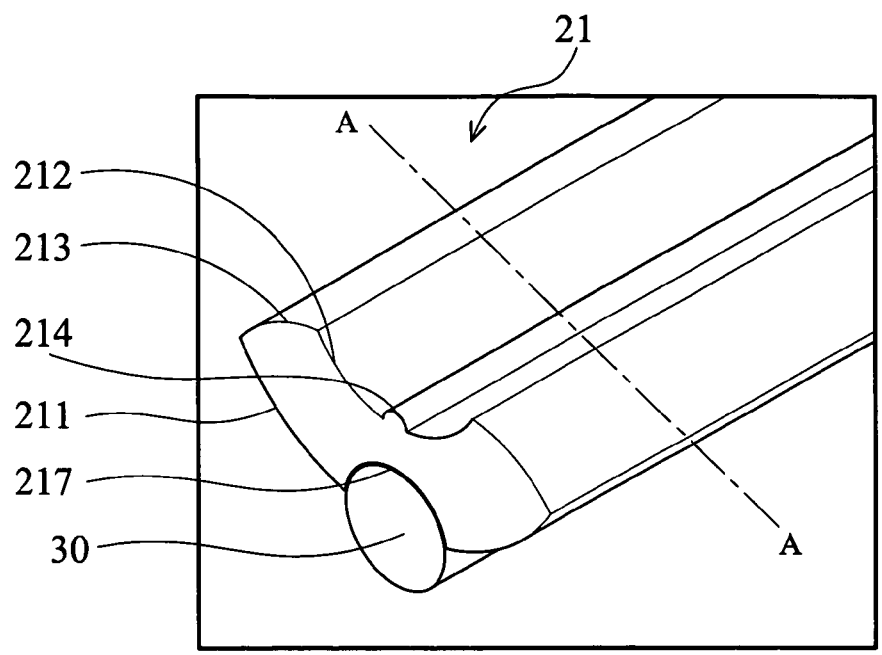
FIG. 3 is a schematic drawing of a lens and a light source.
Figure 4:
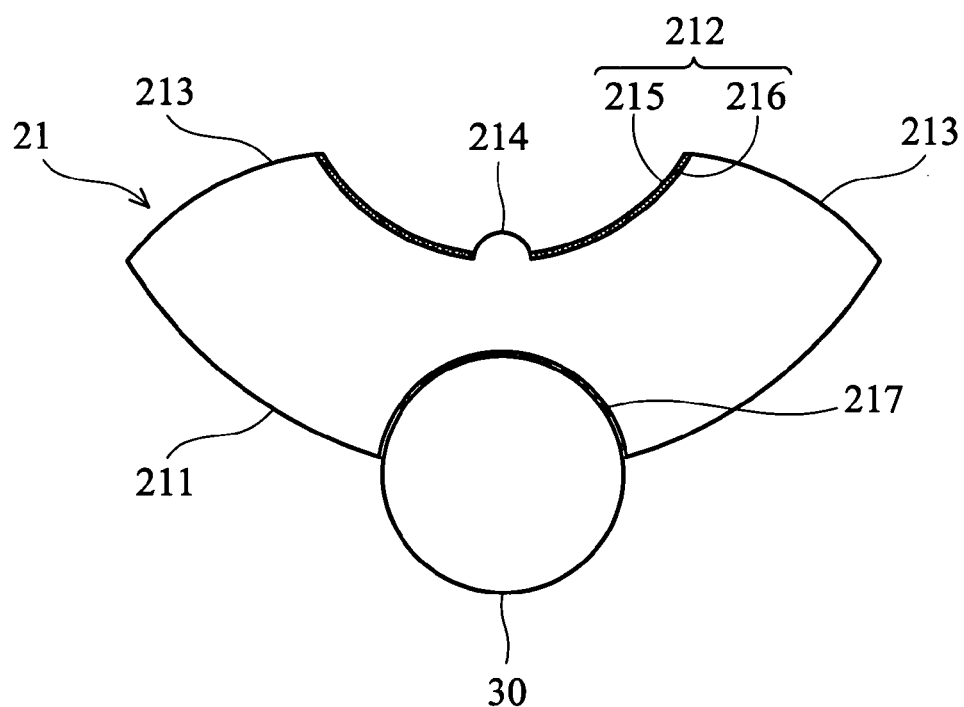
FIG. 4 is a cross-section along hatch A—A of FIG. 3.

Referring to FIGS. 3 and 4, the bottom of a lens 21 is a light-permeable surface 211. A cross-section of the light-permeable surface 211 is concave. A light-reflecting surface 212, adjacent to the light-permeable surface 211, comprises a front reflective layer 215 and a rear reflective layer 216. A cross-section of the light-reflecting surface 212 is concave. The side surfaces 213 are translucent or transparent and connect the light-reflecting surface 212 and the light-permeable surface 211 by an inclined angle. The diffusion surface 214 is convex, formed on the central axis of the light-reflecting surface 212. The light-permeable surface 212 comprises a space 217 in the center of the light-permeable surface 211, for accommodating the light source 30.

Figure 5:
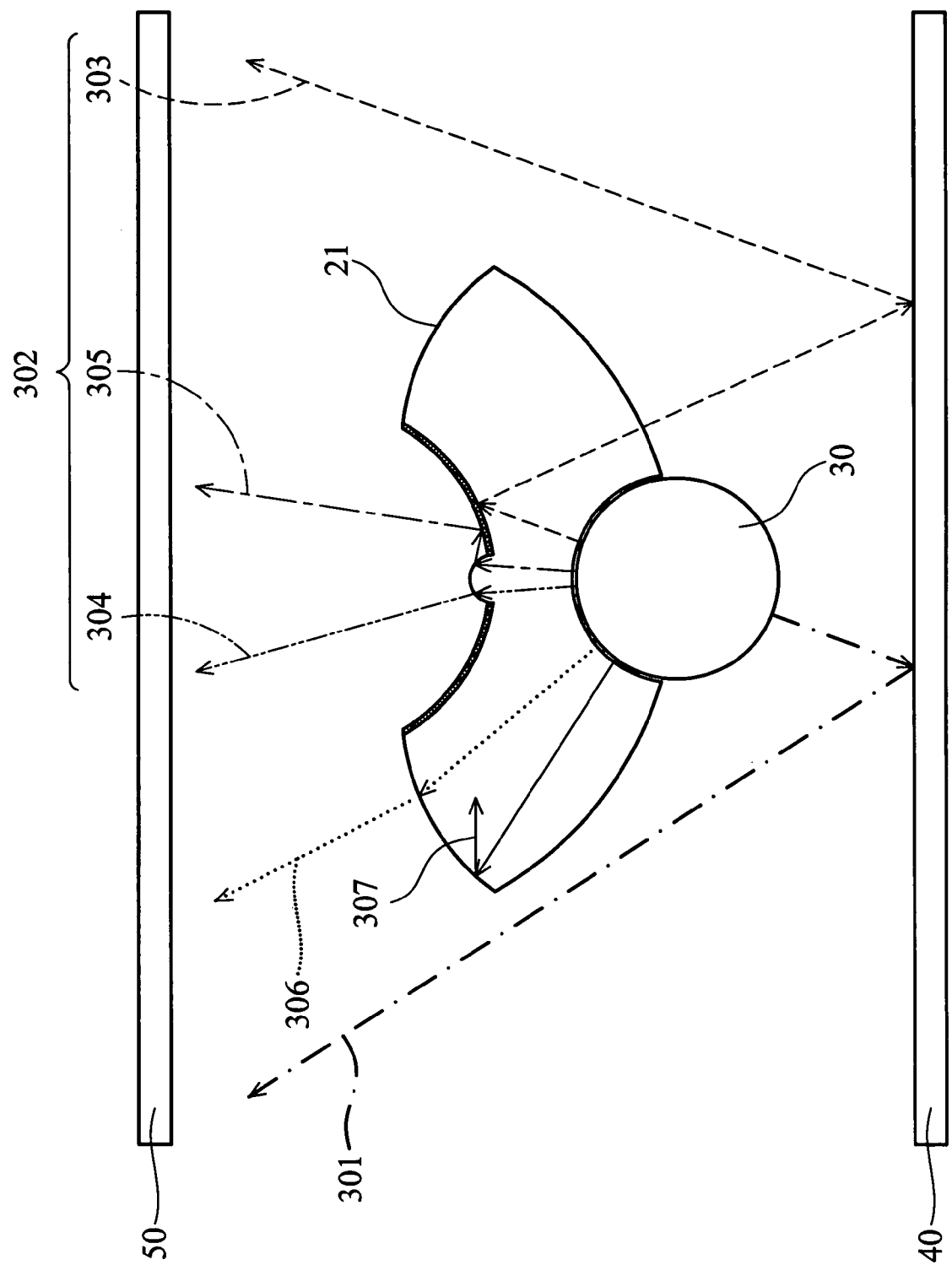
FIG. 5 is a light path of emitted light of a backlight module of the invention.

Referring to FIGS. 3, 4 and 5, the backlight module (not shown) comprises a reflective sheet 40, light source 30, a diffuser 50, and a lens 21. The lens 21 is located above the light source 30. The light source 30 is located above the reflective sheet 40. The lens 21 is located above the light source 30. The lens 21 comprises light-reflecting surface 212, light-permeable surface 211, side surfaces 213, and diffusion surface 214. The cross-section of the light-permeable surface 211 is concave. The light-reflecting surface 212, on the light-permeable surface 211, comprises front reflective layer 215 and the rear reflective layer 216. A cross-section of the light-reflecting surface 212 is concave. The side surfaces 213 are translucent or transparent and connect the light-reflecting surface 212 and the light-permeable surface 211 by an inclined angle. The diffusion surface 214 is convex, formed on the central axis of the light-reflecting surface 212. The light-permeable surface 212 comprises a space 217 in the center of the light-permeable surface 211, for accommodating the light source 30. A diffuser 50 is disposed above the lens 21.

The light source 30 generates a rear beam 301 and a front beam 302. The rear beam 301 is emitted to the reflective sheet 40 and reflected therefrom to the diffuser 50. The front beam 302 is emitted to the lens 21 directly.

The front beam 302 comprises a reflective light beam 303, a direct diffused light beam 304, and an indirect diffused light beam 305. The reflective light beam 303 is emitted from the light source 30, reflected from the rear reflective layer 216 of the lens 21, emitting to and reflected from the reflective sheet 40, and emitting to the diffuser 50.

The direct diffused light beam 304 is emitted from the light source 30, passing through the lens 21, and scattered to the diffuser 50 by the diffusion surface 214. The indirect diffused light beam 305 is emitted by the light source 30, passing through the lens 21, scattered to and reflected from the front reflective layer 215 by the diffusion surface 214, and emitting to the diffuser 50.

The side surfaces 213 are translucent or transparent. A first side light beam 306 is emitted from light source 30, passing through the lens 21, and emitting to and through the side surfaces 213, and emitting to the diffuser 50. A second side light beam 307 comprises light that fails to pass through the side surfaces 213 and then returns back to the lens 21.

Via the lens, the invention provides various light beams comprising the front beam 302 including the reflective light beam 303, the direct diffused light beam 304, and the indirect diffused light beam 305, the rear beam 301, the first side light beam 306, and the second side light beam 307, generating normalized light distribution, decreasing inconsistent luminance between light source 30 and reflective sheet 40.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module for a liquid crystal display, comprising:
   a reflective sheet;
   a light source; and
   at least one lens comprising
      a light-reflecting surface;
      a light-permeable surface;
      two side surfaces; and
      a diffusion surface;
   wherein the lens is located above the light source;
   the light-permeable surface is located on the bottom of the lens and the light-permeable surface is concave;
   the light-reflecting surface is located above the lens and the light-reflecting surface is concave;
   the two side surfaces connect the light-reflecting surface and the light-permeable surface; and
   the diffusion surface is convex, formed on the central axis of the light-reflecting surface.

2. The backlight module as claimed in claim 1, wherein the light-reflecting surface comprises a rear reflective layer facing the light source and a front reflective layer opposite to the rear reflective layer.

3. The backlight module as claimed in claim 1, wherein the side surfaces are translucent.

4. The backlight module as claimed in claim 1, wherein the lens has a space for accommodating the light source.

5. The backlight module as claimed in claim 1, wherein the light source is adapted for providing a rear beam emitting to and reflected from the reflective sheet.

6. The backlight module as claimed in claim 1, wherein the light source is adapted for emitting a front beam to the lens directly.

7. The backlight module as claimed in claim 6, further comprising a diffuser above the lens.

8. A lens, comprising:
   a bottom portion having a light-permeable surface;
   a top portion having a light-reflecting surface opposite to the light-permeable surface;
   two side surfaces connecting the light-reflecting surface and the light-permeable surface; and
   a diffusion surface formed on the central axis of the light-reflecting surface;
   wherein the light-permeable surface is concave and a space is included on the light-permeable surface;
   the light-reflecting surface is concave; and
   the diffusion surface is convex.

9. A display incorporating a lens of claim 8.

* * * * *